US00RE34739E

United States Patent [19]

Nelson et al.

[11] E Patent Number: Re. 34,739

[45] Reissued Date of Patent: Sep. 27, 1994

[54] SEAL RETAINING CONFIGURATION FOR HUMIDIFIER

[75] Inventors: Kirk A. Nelson, Minneapolis; Peter J. Loniello, Richfield, both of Minn.

[73] Assignee: Dri Steem Humidifier Co., Eden Prairie, Minn.

[21] Appl. No.: 966,467

[22] Filed: Oct. 26, 1992

Related U.S. Patent Documents

Reissue of:

[64] Patent No.: 5,099,823
Issued: Mar. 31, 1992
Appl. No.: 559,383
Filed: Jul. 25, 1990

U.S. Applications:

[63] Continuation of Ser. No. 395,758, Aug. 18, 1989, abandoned.

[51] Int. Cl.[5] ..... F24H 3/14

[52] U.S. Cl. ..... 126/113; 126/350 B; 126/377; 220/325; 220/327

[58] Field of Search ..... 126/113, 377, 373, 350 B; 220/325, 327, 357, 358; 392/386, 387, 394, 403; 137/577, 590, 590.5

[56] References Cited

U.S. PATENT DOCUMENTS

| | | | |
|---|---|---|---|
| 676,486 | 6/1901 | Beaver | 220/327 |
| 946,654 | 1/1910 | Clark et al. | 220/325 |
| 1,010,792 | 12/1911 | Page | 220/325 |
| 4,239,956 | 12/1980 | Morton | 126/113 |
| 4,660,736 | 4/1987 | Mays | 220/327 |

FOREIGN PATENT DOCUMENTS

| | | | |
|---|---|---|---|
| 2433143 | 4/1980 | France | 220/325 |
| 321637 | 7/1957 | Switzerland | 220/325 |

OTHER PUBLICATIONS

Brochure Form No. HEH-R2-0584 entitled *Humidiflo Evaporative Humidifiers* by DRI-STEEM Humidifier Company, 1984.

*Primary Examiner*—James C. Yeung
*Attorney, Agent, or Firm*—Woodcock Washburn Kurtz Mackiewicz & Norris

[57] ABSTRACT

A humidifier unit is used with a forced air heating system and includes a water reservoir, a water inlet connection to the reservoir, control means for maintaining the water level at a predetermined depth, and a heat exchanger for heating the water to produce steam. This reservoir has a removable top plate for closing the open top defined by the upper edges of side and end walls. Horizontal flanges extend inward from the upper edges of the reservoir side and end walls and act as a gasket base. Lips extend upward from the inner edges of those horizontal flanges and act as an internal horizontal gasket retainer. Finally, flanges depend from all sides of the top plate and are positioned to surround the upper edges of the side walls and to act as an external horizontal gasket retainer.

11 Claims, 2 Drawing Sheets

SEAL RETAINING CONFIGURATION FOR HUMIDIFIER

Matter enclosed in heavy brackets [ ] appears in the original patent but forms no part of this reissue specification; matter printed in italics indicates the additions made by reissue.

This is a continuation of application Ser. No. 395,758, filed Aug. 18, 1989, now abandoned.

BACKGROUND OF THE INVENTION

1. Field of the Invention

The present invention relates generally to humidifier units of the type used with forced air heating systems, and more particularly, to the retention of a gasket at the juncture between a top plate and side walls of a water reservoir.

2. Description of the Prior Art

Humidifiers disclosed in the prior art use a gasket between the cover plate and the top of the reservoir. The gasket is seated on horizontal flanges extending inwardly from the top edges of reservoir side walls. However, no configurations currently retain the gasket from the common occurrences of both inward or outward slippage. Additionally, a support stop is desirable to prevent the gasket from being compressed excessively as the top plate is removed and replaced, which can cause a permanent deformation of the gasket. Such deformation may render it ineffective as a seal. The present invention overcomes the disadvantages of the prior art by providing a configuration of the side walls which retains the gasket from internal and external slippage and prevents it from being compressed excessively.

SUMMARY OF THE INVENTION

The present invention relates to humidifiers having a configuration which retains a gasket at the juncture between a top plate and side walls of a reservoir, thus preventing the escape of steam.

This configuration includes horizontal flanges which extend inward from the upper edges of the reservoir side walls and act as a gasket base. Lips extend upward from the inner edges of the inwardly extending horizontal flanges and act as an internal gasket retainer. Also, flanges depend from all sides of the top plate and are positioned to surround the upper edges of the side walls and to act as an external gasket retainer. The gasket is prevented from slipping or moving horizontally by the internal lip and by the external flanges.

One embodiment of the present invention provides internal gasket retainer lips which extend far enough upward to stop compression of the gasket when it has been compressed sufficiently for sealing and thereafter to support excess pressure of the top plate. This embodiment also has flanges which extend outward and horizontally from the depending flanges of the top plate. Fasteners interact with these horizontal flanges and the side walls to clamp down the top plate.

The top or cover plate may be retained relative to the side walls with threaded male knobs, each passing through an aperture in a horizontal flange of the top plate and an anchor connected to a side wall, and screwing into a nut retained on the anchor by a spring clip. Preferably, the knobs shall have shoulder which rests against the horizontal flange of the top plate.

DETAILED DESCRIPTION OF THE PREFERRED EMBODIMENTS

Figure 1:
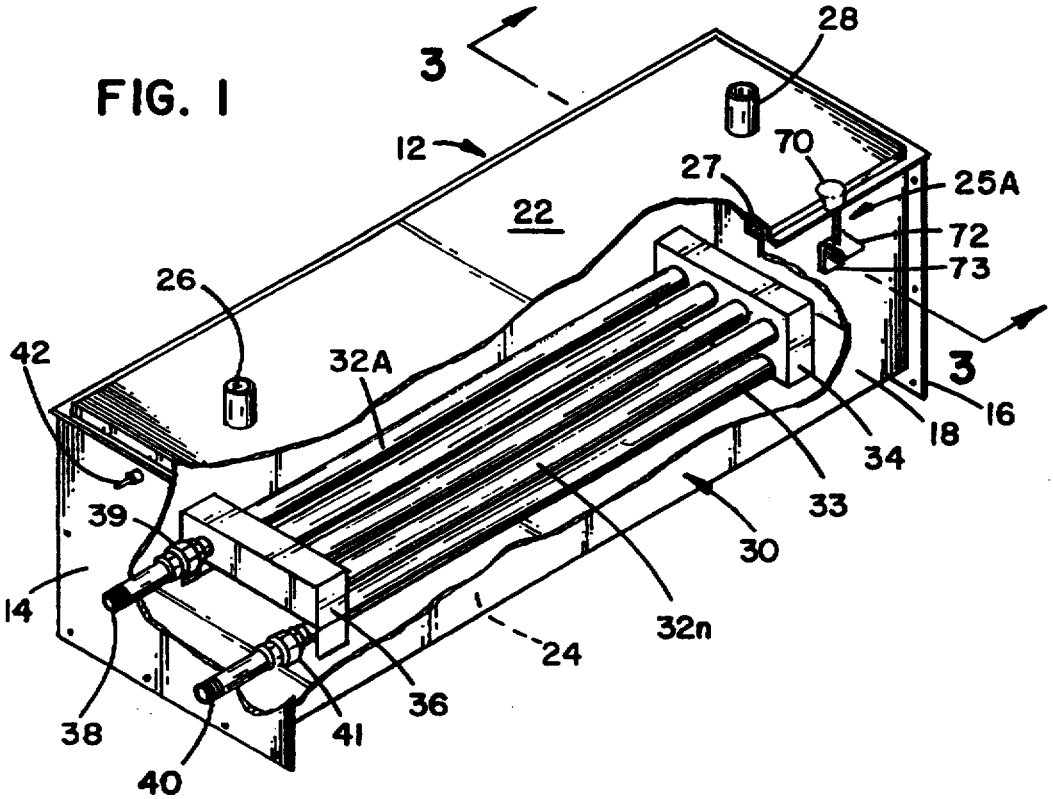
FIG. 1 is a perspective view of a humidifier having a gasket retainer made according to the present invention, with parts broken away.

FIG. 1 illustrates a humidifier 10 which includes a water reservoir embodied as container 12, which has end walls 14 and 16, side walls 18 and 20, a removable top or cover plate 22, and a bottom wall 24. A plurality of fasteners 25, of which 25A is illustrated to clamp the top plate 22 to the open top of the reservoir. A gasket 27 seals the juncture between the top plate 22 and the upper edges of the walls 14, 16, 18 and 20. Steam dispersion tube connections 26 and 28 are secured to the top plate 22. Any suitable dispersion tube may be used. A heat exchanger array 30 includes a plurality of steam or fluid tubes 32 with a steam inlet tube 38 secured to front steam manifold 36 through the front end wall 14 and using a union 39. A drain or return tube 33 is secured to rear manifold 34 and connects to an outlet tube 40 at the front end through a union 41.

Water is introduced into the humidifier reservoir container 12 through water inlet nipple 42 located in front end wall 14. Steam or hot fluid, such as a synthetic material like Dow-Therm or pressurized hot water, is circulated through the heat exchanger array 30 to provide the heat energy for evaporating the water contained in reservoir container 12 to produce steam which passes from reservoir 12 through the dispersion tube connections 26, 28 and into a forced air heating system duct.

Water circulates from the bottom region of the reservoir container 12 upwardly through and around the tubes 32 and the manifolds 34 and 36 of the heat exchanger array 30. Additional heat exchanger tubes can be added and placed side by side, staggered, or aligned in any regular or irregular geometric fashion to promote heat exchange through thermodynamic principles between the plurality of heat exchanger arrays and water.

Figure 2:
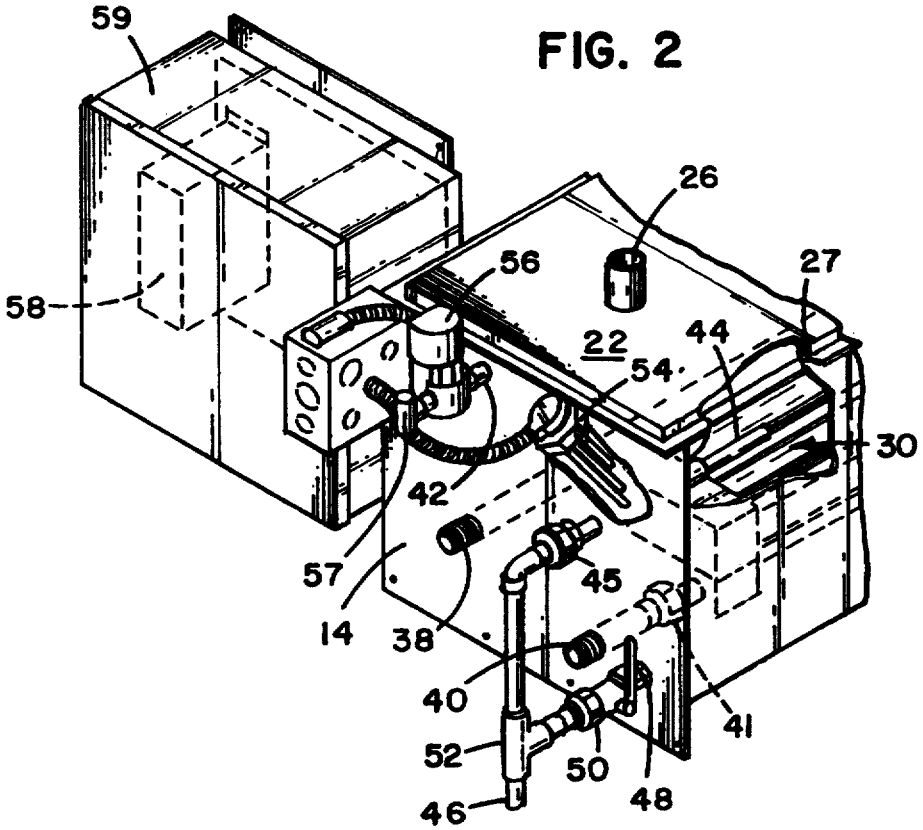
FIG. 2 is a fragmentary perspective view of the humidifier showing control components of the humidifier.

FIG. 2 illustrates a perspective view of the control components of the humidifier. An adjustable surface skimmer 44 can be provided and connected by union 45 with appropriate piping to a drain tube 46. A lower drain 48 and drain valve 50 also connect to the drain tube 46 with a "T" connector 52 for humidifier reservoir drainage. A conductivity level control probe 54 mounts on side wall 14 and connects to an electric solenoid valve 56 through a control module 58 in a cabinet 59, which maintains the water at a predetermined level as sensed by the conductivity probe 54. When energized in response to a low water signal, the electric solenoid valve 56 allows water to flow into the humidifier reservoir container 12 from a water inlet tube 57 and through the water inlet nipple 42. In the alternative, a float operated water fill valve can be provided in lieu of the conductivity probe 54, the electric solenoid valve 56, and the control module 58.

Figure 3:
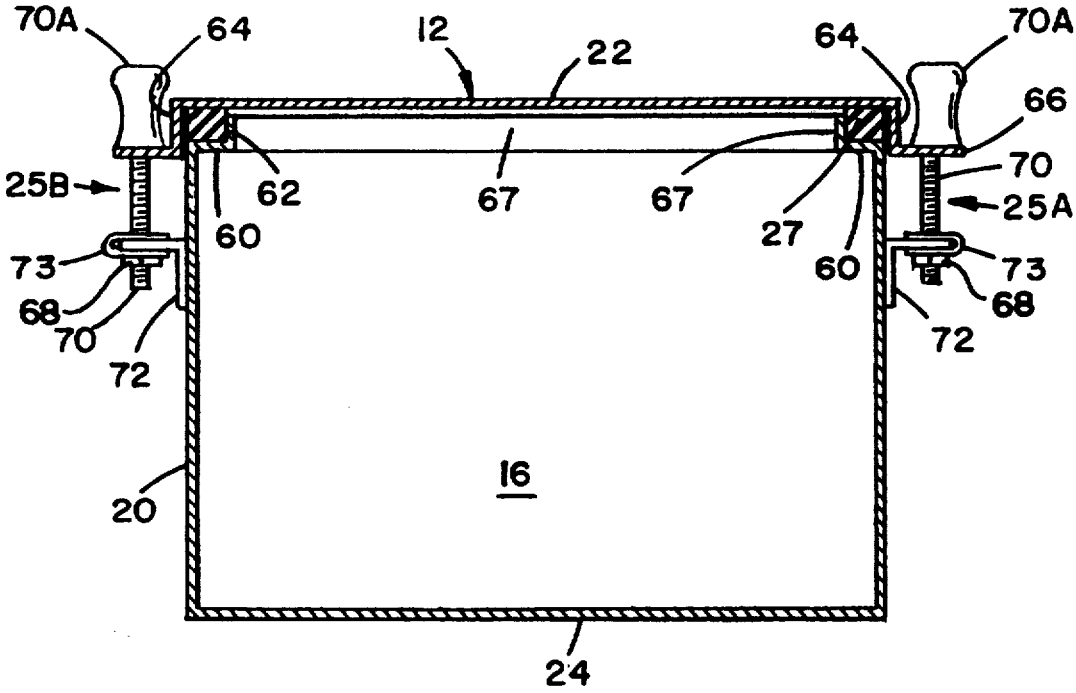
FIG. 3 is a cross-sectional view of the reservoir taken along line 3—3 in FIG. 1.

FIG. 3 illustrates a cross-section of the reservoir 12 showing in detail the features of the present invention. Horizontal flanges 60 extend inwardly from the upper edges of the reservoir end and side walls 14, 16, 18 and 20 and act as a base for gasket 27. These flanges have lips 62 which extend upward from the inner edges of the flanges and act as an internal gasket retainer. The lips 62 are selected in height relative to gasket thickness to act as a stop for the top plate 22 and to support it to prevent excess compression of the gasket 27. Specifically, as is clearly shown in FIG. 3, this is achieved by making the vertical extend or height of the lips 62 relative to flanges 60 greater than or equal to the height of gasket 27 when gasket 27 is given its maximum permissible vertical compression. However, the height of lips 62 are not so great to prevent some compression of the gasket, however, for effecting a seal.

Figure 4:
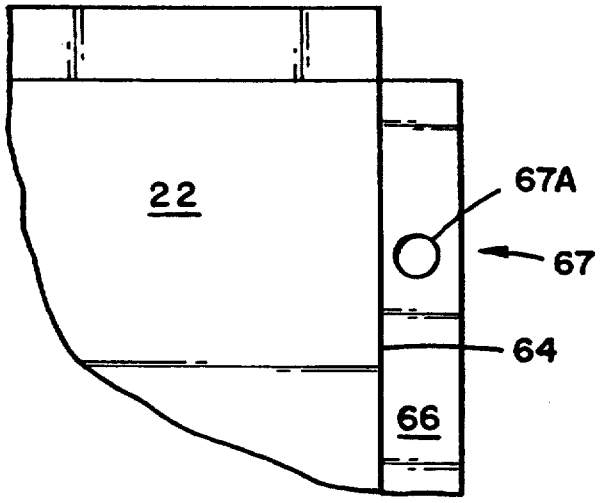
FIG. 4 is a fragmentary top plan view of one corner of the top plate.
Figure 5:
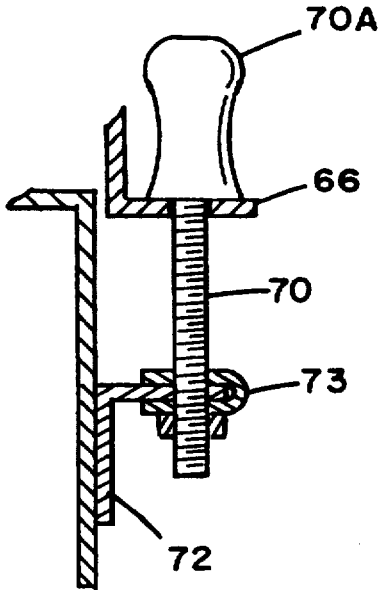
FIG. 5 is a sectional view of a fastener.

The top or cover plate 12 has vertical flanges 64 which depend from all sides of the removable top plate 22. The vertical flanges are positioned to surround or encompass the upper edges of the end and side walls of the reservoir and to act as an external gasket retainer to keep the gasket from moving horizontally outward. Horizontal flanges 66 extend outward from the depending flanges 64 of the top plate 22 and have a plurality of apertures 67, of which 67A is shown in FIG. 4, that act as receptacles for fasteners 25. Fasteners 25, of which 25A and 25B are shown in FIG. 3, are coupled to the side walls 18 and 20 and the horizontal flanges 66 of the top plate 22 and provide for quick removal of the top plate. Fasteners 25 include knob head threaded male sensors 70 that mate with nuts 68 which are retained to anchors 72 by spring clips 73. The anchors 72 each have a clearance hole though which the screws 70 pass the knobs 70A on screws 70 and makes manual operation of the screws easy.

This invention provides a configuration of the humidifier which retains the gasket from slipping inward into the reservoir or outward during operation. In addition, the height of the lips which retain the gasket from inward slippage is low enough to allow the cover to contact and compress the gasket when clamped by the fasteners, thereby sealing the humidifier. The lips are also high enough to contact and support the clamped cover when further compression would deform the gasket and result in an ineffective seal. Also, the fastener means facilitates quick maintenance of the humidifier unit.

The lips 67 do not have to be continuous around the perimeter, and, for example, can have scalloped edges. They also can be short sections that are spaced apart along the length of the side walls and end walls.

Although the present invention has been described with reference to preferred embodiments, workers skilled in the art will recognize that changes may be made in form and detail without departing from the spirit and scope of the invention.

What is claimed is:

1. A humidifier unit of the type used with a forced air heating system including a water reservoir defined by walls having upper edges forming an open top and having a removable top plate for closing the open top and fasteners for clamping the top plate in direction toward the top edges, a water inlet connection to the reservoir, control means for maintaining the water level at a predetermined depth within the reservoir, and means for heating the water within the reservoir to produce steam, wherein the improvement comprises:

horizontal flanges extending inward from the upper edges of the reservoir walls to form a gasket base;

a lip extending upward form inner edges of the horizontal flanges and acting as an internal horizontal gasket retainer along substantially the length of the horizontal flanges;

a gasket placed on the horizontal flanges; and second flanges depending from all sides of the removable top plate and positioned to surround the upper edges of the walls and to act as an external horizontal gasket retainer, the lip extending far enough from the inner edges of the horizontal flanges and from the upper edges of the walls to stop compression of the gasket after the gasket has been compressed a predetermined amount, the lip thereafter mechanically supporting the top plate.

2. The humidifier unit of claim 1, further comprising means for fastening the top plate to at least one of the walls.

3. The humidifier unit of claim 1, wherein the reservoir has side and end walls, and wherein the flanges and lips are integrally formed with the respective side and end walls.

4. The humidifier unit of claim 3 wherein the fasteners comprise means for fastening the top plate to the walls of the humidifier water reservoir to insure a tight seal and to facilitate maintenance comprising:

second horizontal flanges extending outwardly from the second flanges on the top plate;

elongated threaded fasteners in the second horizontal flanges of the top plate, and having knobs on one end positioned above the second horizontal flanges; and anchors connected to the walls of the humidifier below the second horizontal flanges and aligned with the respective openings for receiving the respective threaded fasteners to permit clamping the top plate against the gasket.

5. A humidifier unit of the type used with a forced air heating system including a water reservoir defined by side and end walls joined to form the reservoir, the walls having upper edges forming an open top having a periphery and having a removable top plate for closing the open top, a water inlet connection to the reservoir, control means for maintaining the water level at a predetermined depth within the reservoir, and means for heating the water within the reservoir to produce steam, wherein the improvement comprises:

horizontal flanges extending inward from the upper edges of each of the reservoir walls and acting as a gasket base around substantially the entire periphery;

a lip extending upward toward the top plate from inner edges of each of the horizontal flanges and acting as an internal horizontal gasket retainer to prevent inward movement of the gasket;

a gasket placed on the horizontal flanges;

a latch means on the exterior of the side and end walls for clamping the top plate in direction toward the horizontal flanges to compress the gasket; and second flanges depending from all sides of the removable top plate and positioned to surround the upper edges of the side and end walls and to act as an external horizontal gasket retainer, at least portions of the lips on each of the side and end walls extending far enough upward from the inner edges of the horizontal flanges to stop compression of the gasket after the gasket has been compressed a predetermined amount, the lips thereafter mechanically supporting the top plate.

6. A water reservoir of the type which is used to contain water and steam in a humidifier for a forced air heating system, comprising:

a reservoir container having a bottom and walls having upper edges which define an open top, said container further comprising a horizontal flange extending inwardly from at least one of said upper edges, said horizontal flange having an upper surface and an inner edge; a lip extending upwardly for a first vertical distance from said inner edge of said horizontal flange, said lip having an upper edge; and a gasket on said upper surface of said horizontal flange, said gasket having an uncompressed height which is greater than said first vertical distance and a minimum, fully compressed height which is less than said first vertical distance;

a removable top plate having a bottom surface; and means for fastening said top plate to said container so that said gasket sealingly contacts said bottom surface of said top plate, whereby said upper edge of said lip will also contact said bottom surface to protect said gasket against over-compression.

7. The reservoir of claim 6, wherein said container comprises at least three of said flanges and lips, and said lips are substantially continuous along the inner edges of the horizontal flanges, whereby said gasket is retained against inward slippage by said lip.

8. The reservoir of claim 6, wherein said fastening means comprises means for fastening the top plate to at least one of the walls.

9. The reservoir of claim 6, wherein the container has side and end walls, and wherein the flange and lip are integrally formed.

10. A reservoir according to claim 6, wherein said top plate has at least one downwardly depending flange, said flange being adapted to overlap one of said container walls, thereby tending to retain said gasket and center said top plate on said container.

*11. An improved reservoir of the type which is used to contain water and steam in a humidifier for a forced air heating system comprising:*

*a reservoir container having a bottom and at least one wall having an upper edge which defines an open top, said container further comprising a horizontal flange extending inwardly from said upper edge, said horizontal flange having an upper surface and an inner edge;*

*a compressible gasket on said upper surface of said horizontal flange, said compressible gasket having an uncompressed vertical height and a fully compressed vertical height;*

*a removable top plate having a bottom surface;*

*means for fastening said top plate to said container so that said gasket is pressed against and seals said bottom surface of said removable top plate; and*

*a lip for limiting compression of said compressible gasket, said lip being positioned between said upper surface of said horizontal flange and said bottom surface of said removable top plate, said lip having a vertical height which is less than said uncompressed vertical height of said gasket but greater than said compressed vertical height, whereby limited compression of said gasket for sealing purposes is allowed but over compression of said gasket which could elastically deform said gasket is prevented.*

* * * * *